United States Patent
Magri et al.

(10) Patent No.: US 11,901,938 B2
(45) Date of Patent: Feb. 13, 2024

(54) FAULT CLASSIFICATION

(71) Applicant: Telefonaktiebolaget LM Ericsson (publ), Stockholm (SE)

(72) Inventors: Roberto Magri, Genoa (IT); Paolo Debenedetti, Genoa (IT); Stefano Orsi, Genoa (IT); Marcello Morchio, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 17/635,908

(22) PCT Filed: Aug. 20, 2019

(86) PCT No.: PCT/EP2019/072303
§ 371 (c)(1),
(2) Date: Feb. 16, 2022

(87) PCT Pub. No.: WO2021/032292
PCT Pub. Date: Feb. 25, 2021

(65) Prior Publication Data
US 2022/0311512 A1 Sep. 29, 2022

(51) Int. Cl.
*H04B 10/08* (2006.01)
*H04B 10/077* (2013.01)
*H04B 10/079* (2013.01)

(52) U.S. Cl.
CPC ..... *H04B 10/0771* (2013.01); *H04B 10/0791* (2013.01)

(58) Field of Classification Search
CPC ............ H04B 10/0771; H04B 10/0791; H04B 10/0779; H04B 10/0795; H04B 10/07955;
(Continued)

(56) References Cited

U.S. PATENT DOCUMENTS

| 10,404,362 | B1* | 9/2019 | Xu | H04B 10/0791 |
| 11,451,295 | B2* | 9/2022 | Xiao | H04B 10/0791 |

(Continued)

FOREIGN PATENT DOCUMENTS

| EP | 2579480 A1 | 4/2013 |
| EP | 2882114 A1 | 6/2015 |
| WO | 2016062109 A1 | 4/2016 |

OTHER PUBLICATIONS

Derickson, Dennis, et al., "Fiber Optic Test and Measurement", Chapter 11 OTDRs and Backscatter Measurements, Prentice Hall PTR, Jan. 1998, pp. 438-439.

(Continued)

*Primary Examiner* — Hanh Phan
(74) *Attorney, Agent, or Firm* — Murphy, Bilak & Homiller, PLLC

(57) ABSTRACT

A method of identifying a fault in an optical link comprises continually storing samples of a signal that represents a power of an optical signal received over the optical link. When a fault is detected on said optical link, at least one stored series of samples of the signal is retrieved. The method then comprises performing a classification on the retrieved series of samples, in order to classify the series of (Continued)

samples as resulting from one of a plurality of predefined faults.

17 Claims, 15 Drawing Sheets

(58) Field of Classification Search
CPC .. H04B 10/07957; H04B 10/40; H04B 10/27; H04B 10/071; H04B 10/69; H04B 10/691
USPC .... 398/16, 33, 38, 9, 10, 13, 17, 20, 22, 23, 398/24, 25, 26, 27, 158, 159, 135, 136, 398/202, 208, 209, 72, 21
See application file for complete search history.

(56) References Cited

U.S. PATENT DOCUMENTS

| | | |
|---|---|---|
| 2013/0088718 A1 | 4/2013 | Perron et al. |
| 2014/0205279 A1* | 7/2014 | Lee ................. H04B 10/071 398/21 |
| 2017/0033862 A1* | 2/2017 | Dupuis ............ H04B 10/07955 |

OTHER PUBLICATIONS

FastAI, "Welcome to fastai", <https://docs.fast.ai/>, accessed Sep. 27, 2019, 2019, pp. 1-6.

He, Kaiming, et al., "Deep Residual Learning for Image Recognition", 2016 IEEE Conference on Computer Vision and Pattern Recognition (CVPR), Las Vegas, NV, USA, 2016, pp. 1-12.

Infinera, "Auto-Lambda: Infinera's Solution for Autotuneable DWDM in Access Networks", Application Note, Infinera Corporation, 2018, pp. 1-5.

Russakovsky, Olga, et al., "ImageNet Large Scale Visual Recognition Challenge", International Journal of Computer Vision, vol. 115, No. 3, Dec. 2015, pp. 1-43.

Wang, Zhiguang, et al., "Encoding Time Series as Images for Visual Inspection and Classification Using Tiled Convolutional Neural Networks", Trajectory-Based Behavior Analytics: Papers from the 2015 AAAI Workshop, Association for the Advancement of Artificial Intelligence, 2015, pp. 40-46.

* cited by examiner

FAULT CLASSIFICATION

TECHNICAL FIELD

This disclosure relates to fault classification, and in particular, to a method of identifying the cause of a fault in an optical link.

BACKGROUND

Optical links are widely used in telecommunications networks, for example for connecting remotely distributed radio nodes of a radio access network to the main site. A loss of communication to a radio node can be caused by several different types of fault or failure, and it is convenient for a network operator to be able to determine the cause of a failure, in order to be able to take remedial action.

However, existing methods for diagnosing a failure are complex and require dedicated and expensive solutions.

For example, a link may be provided with one or more optical time-domain reflectometers (OTDRs). In the event of a fiber failure, the OTDR can determine the position of the failure, but this solution is not able to determine if the failure is due, for example, to the fiber being cut or simply being disconnected.

As another example, a link may be provided with a temporary power supply that can be activated when the main power supply fails, and with a mechanism for detecting an imminent loss of the main power supply, allowing for a warning message to be sent.

These mechanisms do not allow the root cause of a failure to be determined.

SUMMARY

According to a first aspect of the present disclosure, there is provided a method of identifying a fault in an optical link. The method comprising: when a fault is detected on said optical link, retrieving at least one stored series of samples of a signal. The signal represents a power of an optical signal received over the optical link. The method further comprises performing a classification on the retrieved series of samples, in order to classify the series of samples as resulting from one of a plurality of predefined faults.

The method may comprise continually storing the samples of the signal. When the fault is detected on said optical link, retrieving the stored series of the samples of the signal including samples stored before the fault was detected.

The method may comprise storing the samples of the signal for a predetermined time, and then overwriting the stored samples with new samples.

The number of samples stored may be between 1,000 and 10,000 and/or the predetermined time may be between 0.5 and 5 seconds.

The method may comprise retrieving a plurality of stored series of samples of the signal, wherein the plurality of stored series of samples are obtained with different sampling rates.

The method may comprise performing said classification using a machine learning model.

The predefined faults may comprise at least one of: a power fault at a remote end of the optical link; extraction of a module containing an optical transceiver; removal of an optical connector; and a fault in an optical fiber of the optical link.

The step of performing the classification may comprise determining a match with one of the plurality of predefined faults for one or more of:
a gradient of the power of the optical signal against time;
an amount of power, duration and/or number of temporary increase(s) in the power of the optical signal, following a drop in the power of the optical signal;
an amount of variation of the power, and/or duration, of a plurality of temporary increases in the power of the optical signal, following a drop in the power of the optical signal;
an amount of noise in the power of the optical signal against time;
a final power of the stored series of samples of the optical signal; and
a time for the power of the optical signal to drop to zero or a final power.

The method may comprise receiving the optical signal in an optical transceiver module provided in a multi-source agreement form factor, for example a small form-factor pluggable (SFP) module, a Quad Small Form-factor Pluggable (QSFP) module, or a C form-factor pluggable (CFP) module, or a variant thereof such as a CFP2 module.

The method may comprise storing the series of the samples of the signal in a module including an optical transceiver, or may comprise storing the series of the samples of the signal in a host unit including an optical transceiver module.

The method may comprise performing said classification in a module including an optical transceiver, or may comprise performing said classification in a host unit including an optical transceiver module, or may comprise performing said classification in a network node.

According to a second aspect, there is provided a system for identifying a fault in an optical link. The system comprising: a memory configured for storing at least one stored series of samples of a signal, wherein the signal represents a power of an optical signal received over the optical link. The system further comprises a processor configured for, when a fault is detected on said optical link, retrieving said at least one stored series of samples, and performing a classification on the retrieved series of samples, in order to classify the series of samples as resulting from one of a plurality of predefined faults.

According to a third aspect, there is provided an optical module, comprising: a receiver assembly, configured for converting a received optical signal into an electrical signal, and for generating a signal representing a power of the received optical signal. The module further comprises an analog-digital converter, for generating samples of the signal representing the power; and a memory for continually storing the samples of the signal for a predetermined time, and then overwriting the stored samples with new samples, such that the stored samples can be retrieved when a fault is detected on an optical link including the optical module.

The optical module may be further configured for storing a classification model, and for performing a classification on the retrieved samples, in order to classify the samples as resulting from one of a plurality of predefined faults, when the fault is detected.

According to a fourth aspect, there is provided a host unit, configured for receiving an optical module, wherein the optical module comprises: a receiver assembly, configured for converting a received optical signal into an electrical signal, and for generating a signal representing a power of the received optical signal; and an analog-digital converter, for generating samples of the signal representing the power.

The host unit comprises: a memory for continually storing the samples of the signal for a predetermined time, and configured to overwrite the stored samples with new samples, such that the stored samples can be retrieved when a fault is detected on an optical link including the optical module.

The host unit may be further configured for storing a classification model, and for performing a classification on the retrieved samples, in order to classify the samples as resulting from one of a plurality of predefined faults, when the fault is detected.

The host unit may be further configured for sending the retrieved samples to a network node for classification when the fault is detected.

According to a fifth aspect, there is provided a network node, comprising: a memory for storing a classification model, wherein the network node is configured to: when a fault is detected on an optical link, receiving a stored series of samples of a signal representing a power of an optical signal received in an optical module forming part of the optical link; and performing a classification on the received series of samples, in order to classify the samples as resulting from one of a plurality of predefined faults.

This has the advantage that the root cause of a failure can be determined, allowing appropriate action to be taken quickly and efficiently.

Further, any pattern of failures can be analysed, in order to allow preventive measures to be taken.

DETAILED DESCRIPTION

Figure 1:
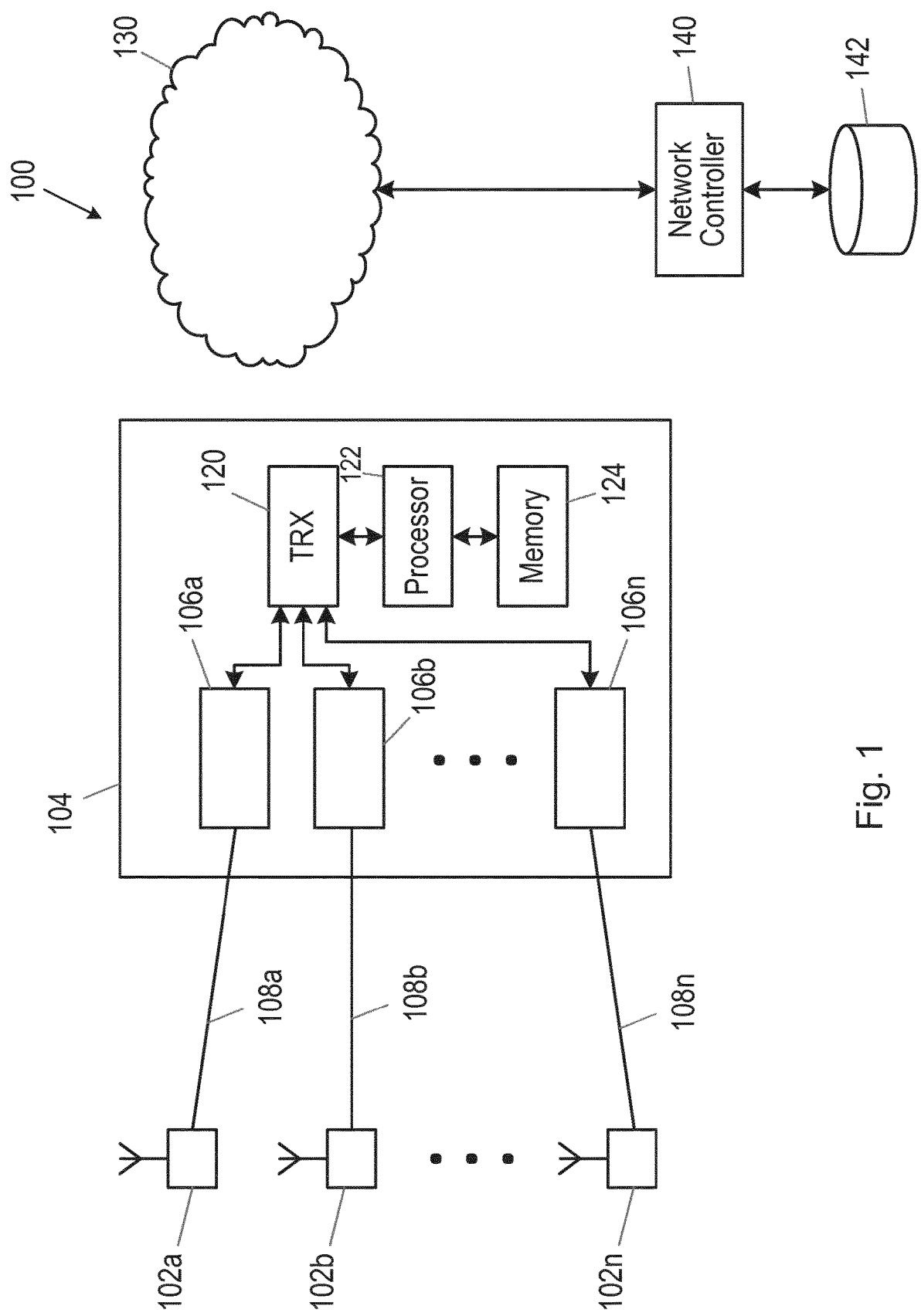
FIG. 1 illustrates a communications network in accordance with the disclosure.

FIG. 1 shows a part of a telecommunications network 100, and in particular shows a part of a radio access network, in which multiple remotely distributed radio nodes 102a, 102b, . . . , 102n are connected to a host unit 104 at a main site of the radio access network. The host unit 104 comprises a respective optical module 106a, 106b, 106n for connection to each of the distributed radio nodes 102a, 102b, . . . , 102n by means of a respective optical fiber 108a, 108b, . . . , 108n. For example, the radio access network may be a fronthaul network, in which case the radio nodes 102a, 102b, . . . , 102n may be radio heads (remote radio units) at the edge of the network, while the host unit 104 is a component of a centralised baseband unit or other processing circuitry board for supporting a plurality of optical modules. Aspects of the disclosure are applicable to any optical link in a radio access network or any optical link in a telecommunications network.

Each of the optical modules 106a, 106b, . . . , 106n may be any suitable form of electro/optic module, typically a module in a multi-source agreement (MSA) form factor, for example any small form-factor (SFF) module, such as a small form-factor pluggable (SFP) module, a Quad Small Form-factor Pluggable (QSFP) module, or a C form-factor pluggable (CFP) module, or variants thereof such as a CFP2 module, etc.

Thus, there is an optical link between the host unit 104 and each of the distributed radio nodes 102a, 102b, . . . , 102n, with the optical link comprising the respective optical module 106a, 106b, . . . , 106n in the host unit, the respective optical fiber 108a, 108b, . . . , 108n, and an optical module (not shown in FIG. 1) in the distributed radio node. In some aspects, the link uses passive optical technology, such as filters, splitters, and transceivers. Each distributed radio node 102a, 102b, . . . , 102n is typically powered with an external AC power supply.

FIG. 1 also shows that the board hosting the pluggable optics 104, hereafter referred as the "host unit", includes transceiver circuitry (TRX) 120, which runs under the control of a processor 122, which in turn has access to a memory 124, which stores data and program instructions for causing the processor 122 to perform methods as described herein. References to processor may also be considered as processing circuitry, e.g. an integrated circuit, FPGA, etc, programmed to execute programmed instructions. References to memory may refer to any type of memory or storage, for example, volatile or non-volatile memory, EEPROM, RAM, ROM, flash drive, or hard disk drive.

The host unit 104, and specifically the transceiver circuitry 120 is connected over a transport network 130 to the rest of the radio access network, and to the core network of the telecommunications network 100.

FIG. 1 also shows a network controller 140 for the transport network 130, as a part of the telecommunications network 100, and having access to a database 142.

Figure 2:
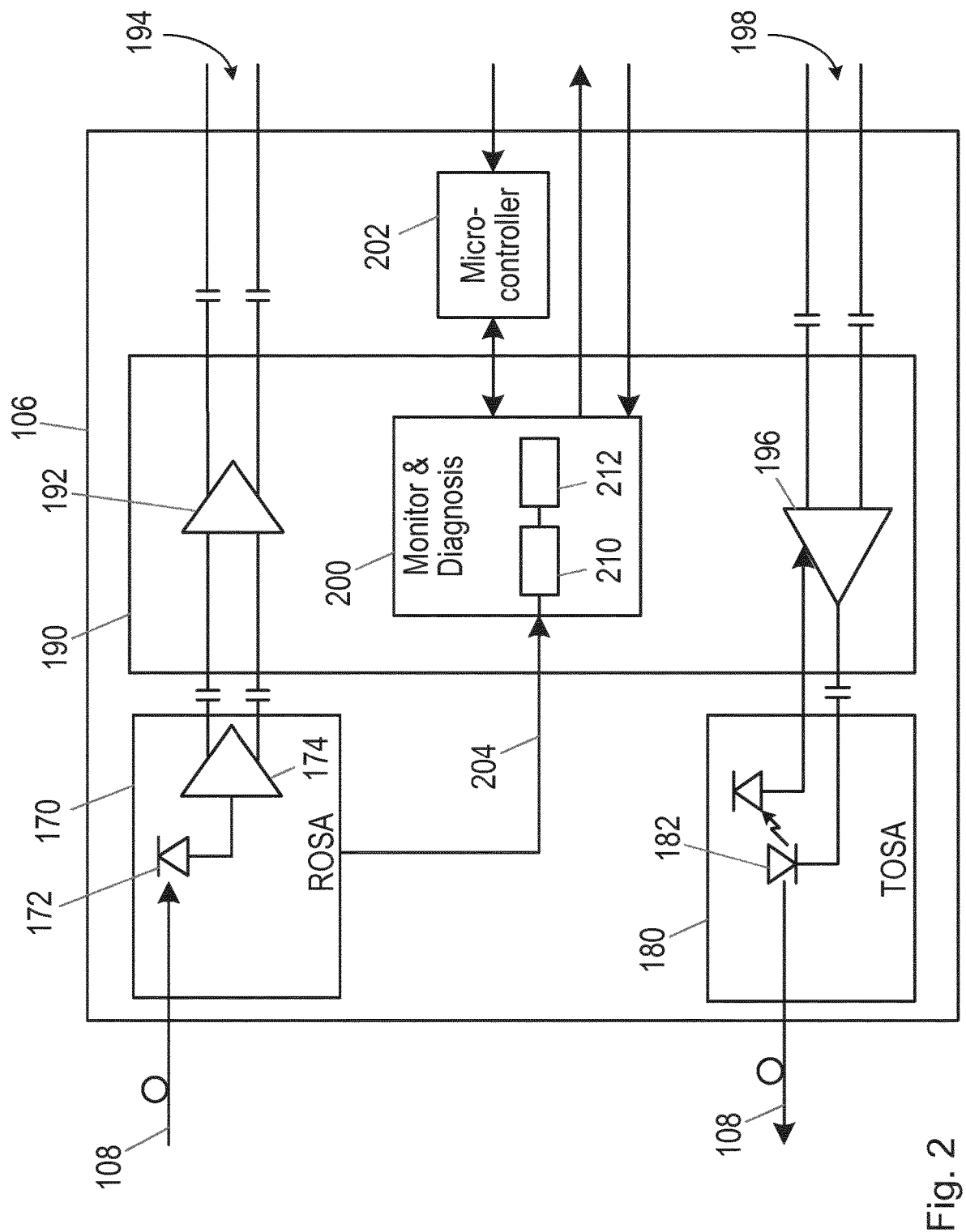
FIG. 2 illustrates a component of the network of FIG. 1.

FIG. 2 shows in more detail the form of an optical module 106, in one example.

Specifically, in this example, the optical module 106 includes a Receiver Optical Subsystem Assembly (ROSA) 170, which includes a photodiode 172 and a transimpedance amplifier (TIA) 174. The photodiode 172 converts light received on the optical fiber 108 into an electrical signal, and the TIA 174 conditions this signal.

The optical module 106 also includes a Transmitter Optical Subsystem Assembly (TOSA) 180, which includes a laser diode 182 configured to generate an optical signal. The laser diode 182 converts a received electrical signal into the optical signal, which it imposes onto the optical fiber 108.

The ROSA 170 and the TOSA 180 are connected to a signal processor 190, which includes a limiting amplifier 192, for receiving the output of the TIA 174 and generating an electrical output signal on the output 194. The signal processor 190 also includes a laser driver 196, for receiving an electrical signal on the input 198, and generating a suitable signal for driving the laser diode 182.

The signal processor also includes a monitoring and diagnosis block 200, which is connected to a microcontroller 202, and which receives a power input signal from the ROSA 170 on the input line 204. More specifically, the ROSA subsystem 170 of the optical module 106 provides, on a dedicated analog wire, a portion of the photo-received current. Typically, this current comes from the same photo-diode 172 used for the photodetection of the optical data signal.

The analog signal received on the line 204 can to be used to measure the received optical power. Optical power monitoring is available on all state-of-art optical modules. Specifically, the photo-current is applied to one or more resistor 210 to give a voltage signal, which is digitized by an analog-digital (A/D) converter 212. Aspects of the disclosure provide for sampling of the received optical power, and storing the samples for analysis in association with a detected fault. In some examples, the sampling is at a rate of the order of hundreds of Hz or a few kHz, for example. As such, the processing circuitry 202 is configured to obtain data on how the received optical signal power varies with time. The data sample rate is fast, allowing for fast variations in received optical signal power to be measured and stored.

The data carried by the optical signal may be modulated at a frequency of the order of Ghz, for example. The optical power recorded does not include variations due to the modulation, since the sample rate is at a lower rate. As such, the measured optical power may be considered as an average optical power, although the sampling rate of the optical power is still relatively fast at hundreds of Hz or kHz. The optical power is measured at input line 204 and then sampled by the A/D converter 212. The sampling happens at a rate sufficient to monitor the dynamics of the typical power transients that can occur due to system or link failures. Post-processing (e.g. averaging) of the sampled values can be optionally applied by the monitoring circuitry in order to reduce the number of samples stored and to mitigate measurement noise effects.

The digitized power information can be accessed by the module micro-controller 202 and/or externally by the host processor 122 or other network entity.

In the case of a loss of optical communication, e.g. to a radio node, it is advantageous for the operator to be able to determine the exact root cause of the loss of communication, for example, in order to take the most convenient action. A loss of communication can be considered as a fault in an optical link, for example, due to a fiber failure, a transceiver failure, a power supply failure at the radio node, or a hardware failure of the radio node or host unit. By determining the root cause of the failure, the operator can avoid costly visits to the remote site when these are unnecessary and in general can plan the necessary maintenance actions to resolve the problem.

The present disclosure relates to a method and system for identifying the type of fault that has caused a loss of communication, using the power information obtained from the averaged optical signal.

Figure 3:
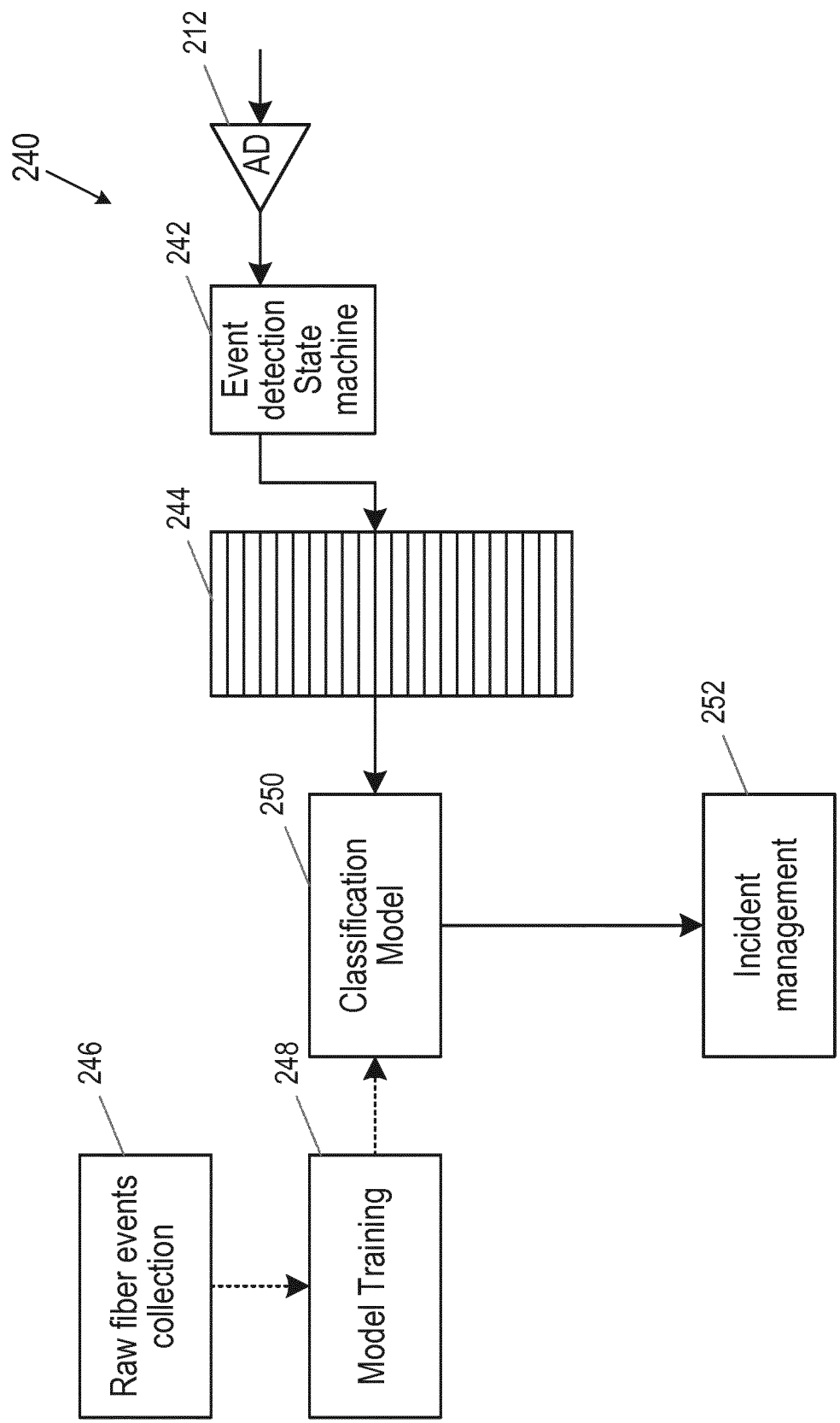
FIG. 3 is a block diagram illustrating a system operating in accordance with the method of the disclosure.

FIG. 3 is a block diagram, illustrating the form of a system 240 according to an aspect of the disclosure.

As described with reference to FIG. 2, a signal received from the ROSA 170 is applied to an A/D converter 212. The resulting digital signal is then applied to an event detection block 242, which determines the operation of the system 240.

Figure 4:
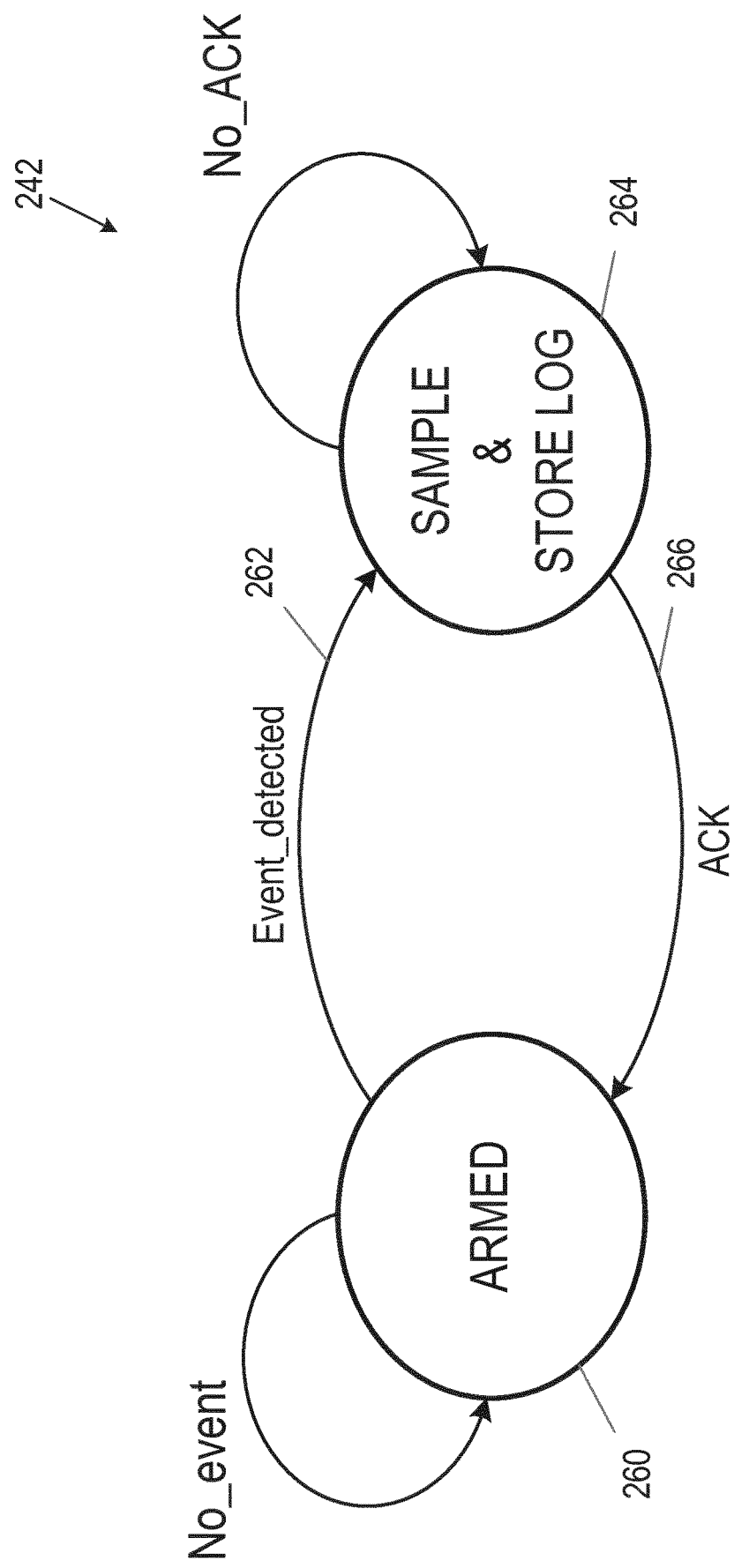
FIG. 4 is a state diagram illustrating the operation of the system of FIG. 3.

The operation of the event detection block 242 can be illustrated by means of a state machine, as shown in FIG. 4.

As shown in FIG. 4, in normal operation of the optical link, e.g. between the respective optical module 106 and the respective distributed radio node 102, the system is in the armed state 260, in which the digital signals generated by the A/D converter 212 are stored in a buffer memory for a sliding time window. That is, a predetermined number of samples of the digital signal are stored in the buffer memory, with each new sample replacing an earlier sample so that the number of stored samples remains the same. For example, the buffer memory stores the optical power measurements for the last 1 second, i.e. a sliding time window of 1 second.

For example, the number of samples stored may be between 1,000 and 10,000 and/or the sliding time window may be between 0.5 and 5 seconds with a sampling rate of the order of hundreds of Hz or kHz.

In some aspects, an event relating to a fault on the link is determined when the received power is measured to be below a threshold value. As such, a fault is detected when the optical power is measured to be below the threshold value. The threshold value is set below the average optical power expected at the receiving side. For example, the threshold may be set to a value in the range of 20%-80% of the average optical power received during normal link operations, for example 50%. In one embodiment of this disclosure it is also possible to monitor the average optical power received during a predefined period of time and use it to adapt the threshold value accordingly (adaptive mode).

When a fault event is detected, as shown at 262, the state machine then transitions to the log state 264, in which the samples stored in the buffer memory at that time are stored as a log, as shown at 244 in FIG. 3.

The log 244 therefore contains the received optical power data samples for a period preceding the detection of the fault. In some aspects, the optical power data samples are continued to be stored for a period following the detection of the fault. For example, the period following the detection of the fault is a predetermined time period or a predetermined number of samples, or until the power is measured to be below a second threshold or zero. In this case, storage to the log of the optical power samples comprises samples from before the fault event is detected, and after the fault event is detected. This may be considered to provide a sliding time window storing measurements around the time of detection of the fault. In some aspects, the log 244 stores measurements of the optical power between a time at which the optical power is normal to a time at which the optical power has reduced to near or at zero power. This provides for measurements of the variation of the optical power during the fault process, and hence identification of the type of fault which has occurred.

Once the storage of the log 244 has been triggered, and the log has effectively been frozen, the availability of a new log is communicated to the host system controller in order to be acquired and made available to the entity responsible for the processing. At this point, an acknowledge message 266 can be sent back to the module to re-arm the detection of new fault events.

As described in more detail below, the log 244 can be stored in memory in the optical module 106, or can be stored in the host equipment 104, or remotely in the cloud.

In addition, for each detected fault event, more than one log can be stored, for example representing different time windows and sampling rates in order to capture events having different dynamics. For example, the monitoring and diagnosis block 200 may include multiple A/D converters, configured for sampling the received optical power signal at different sampling rates, and multiple buffer memories, for storing the respective series of samples.

In an embodiment of this disclosure, an additional monitoring point is added to the TOSA in order to measure the reflected optical power that may happen in case of fiber failure in proximity of the transceiver. Reflection of the transmitted optical power can also be analysed in combination with the measurement of received optical fiber in order to enhance the fiber diagnostic classification.

For example, if a first log contains data with a first sample rate obtained over a time window having a first duration, the second log may contain data with a second sample rate obtained over a time window having a second duration. Then, the second sample rate may be lower than the first sample rate, while the second duration is longer than the first duration.

Thus, power information is stored as one or more log 244 when a fault is detected. As described in more detail below, this disclosure relates to the exploitation of this power information by using the stored history of the time samples over a time window including the power transient event (i.e. the power drop) to classify the kind of event which caused the failure. The idea is that each type of event has a characteristic profile or "fingerprint", represented by the shape of the power transient during a typical example of such a failure. The log 244 obtained during a failure event can then be classified by comparison with these fingerprints. The classification can be carried out by a supervised Machine Learning model.

Thus, returning to FIG. 3, the machine learning process may comprise obtaining offline power data logs as shown at 246 during a large number of fault events. In each case, the type of event giving rise to the particular form of the power data log is known. In addition, further training data can be generated by creating variants of the power data logs and/or by combining the effects of multiple events. A model can then be trained as shown at 248, by using conventional Machine Learning techniques.

This gives a classification model 250. Then, when a log 244 is generated during operation of the device, it can be compared with the classification model 250. If multiple logs are generated during each failure event, the event can be classified by comparing the multiple logs with the fingerprints of the classification model.

The classification can be implemented either by the hosting board 104 or by an off-line processing tool, to read the optical transceiver measurements stored in the log 244 in order to classify the log as one of the predetermined types of event, and therefore determine the most probable root cause of the failure.

Thus, the received signal failure pattern is classified against a set of well-known signal failure patterns with the intention of generating a decision with a reasonable certainty level, where the complexity of the classification mechanism is determined by the required certainty level, and will depend on the available processing power. For example, where an artificial neural network is used for the classification, a neural network with a larger number of layers may be used in situations where more processing power is available.

Thus, any faults on the optical link, including faults that occur only in the remote sites, can be analysed based on information that is available in the host unit at the main site, without therefore requiring any change in the transceivers at the remote sites.

The result of the classification, that is the identification of the type of fault that is likely to have caused that power signal profile, is then passed to an incident management block 252, which can take the necessary action, which may involve providing information to rectify the immediate cause of the fault (for example repairing or replacing a damaged fiber) and/or may involve examining patterns of faults (for example identifying types of module that are prone to higher than average failure rates).

In some examples, the log 244 is stored in the optical module itself. After the failure, the contents of the log 244 may for example be moved to a protected area of the module 106, for example termed a black-box area within the Flash EEPROM, so the log persists even in the event of a failure of the transceiver module. In further examples, the log is stored in the host unit or other network or cloud entity.

Figure 5:
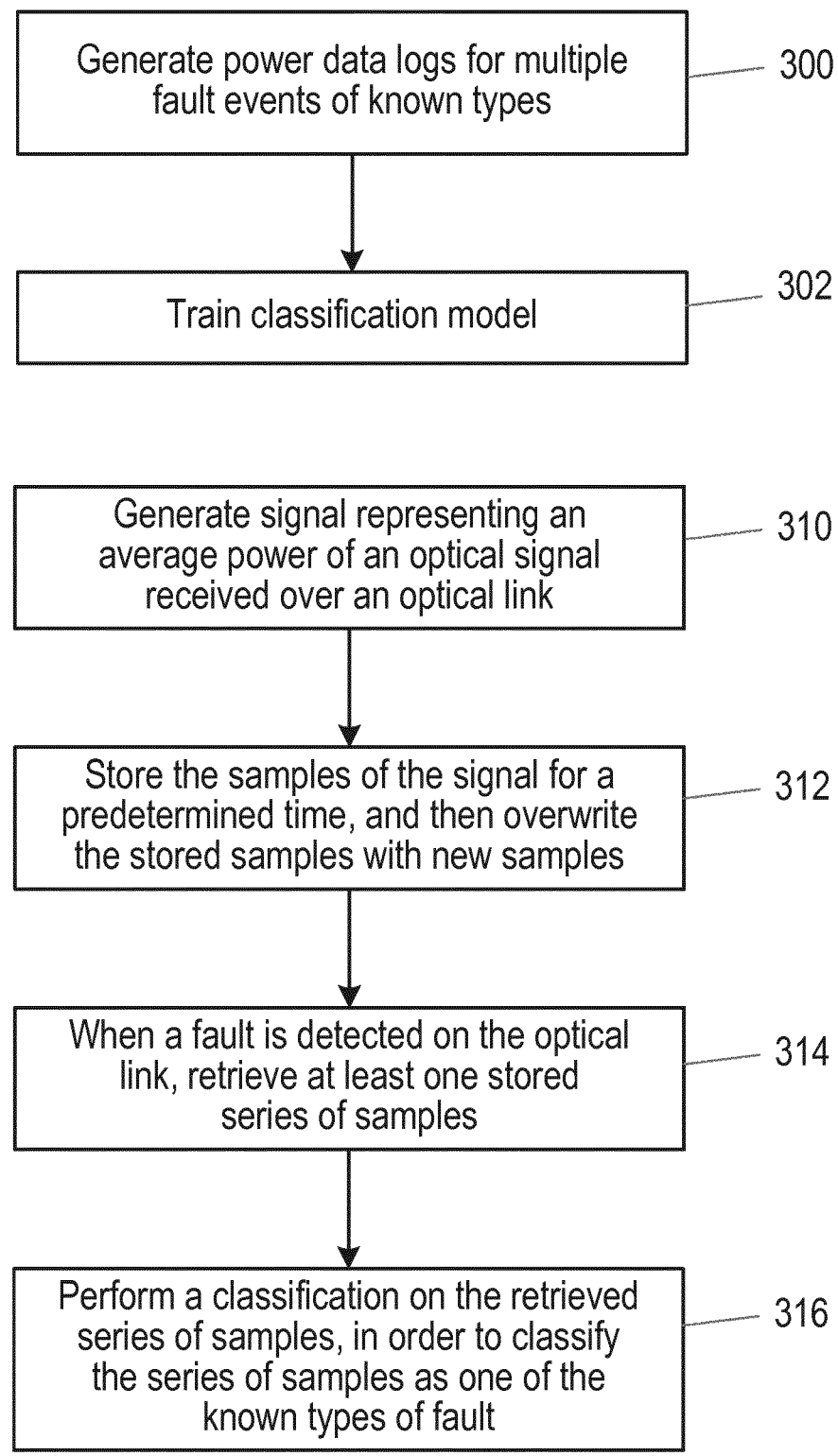
FIG. 5 is a flow chart illustrating an example of a method according to the disclosure.

A method according to examples of the disclosure are shown in the flow chart of FIG. 5.

The method includes an offline stage performed before application to a live link, and a second stage performed on the live link.

The offline stage comprises step 300, namely generating power data logs for multiple fault events of known types, and step 302, namely training a classification model based on the power data logs.

During live operation of an optical link, in step 310, a signal is generated representing a power of an optical signal received over the optical link. In some aspects, the power is an average in averaging out the modulation carried by the optical signal. In step 312, the samples of the signal are stored for a predetermined sliding time window. That is, the samples are stored in a memory having a first-in, first-out memory having a finite capacity, such that the stored samples are overwritten after the predetermined time with newly received samples.

Then, in step 314, when a fault is detected on the optical link, at least one stored series of samples is retrieved. The retrieved samples comprise samples relating to immediately prior to detection of the fault and/or samples immediately after detection of the fault. The retrieved samples relate to a sliding time window, the window including the power variations around the fault event. In step 316, a classification is performed on the retrieved series of samples, in order to classify the series of samples as one of the known types of fault.

The following figures show some examples of the received optical power samples, showing variations of power with time, i.e. power curves, resulting from different types of fault events.

In the following figures, the vertical axis has been normalized to the maximum average power of the stable link received in an arbitrary time window. The horizontal axis is labelled with the number of samples. Since the samples for each log are recorded at a constant intervals, the horizontal axis may alternatively be considered as a time axis. Thus, each of the following figures shows the time history of the power, from a point in time just before the power falls below the 1.0 or 100% level, for a fixed period of time defined by the number of samples (i.e. 500 samples in each of these examples). It should be noted that these figures just show typical examples of the power curves that result, because the variety of the possible shapes of the received power curve is infinite. The description attached to the images provides examples of the general behaviour. if the recorded samples match the pattern shown, a determination can be made that there the associated type of fault has occurred.

FIGS. 6(*a*) and 6(*b*) show examples of the power curve in the event of a power fault in the remote host, which may for example be a power fault of the full host or of the optical module only. In some aspects, the remote host may be considered as the optical transceiver module or unit which is remote from the sample measurement unit.

Figure 6A:
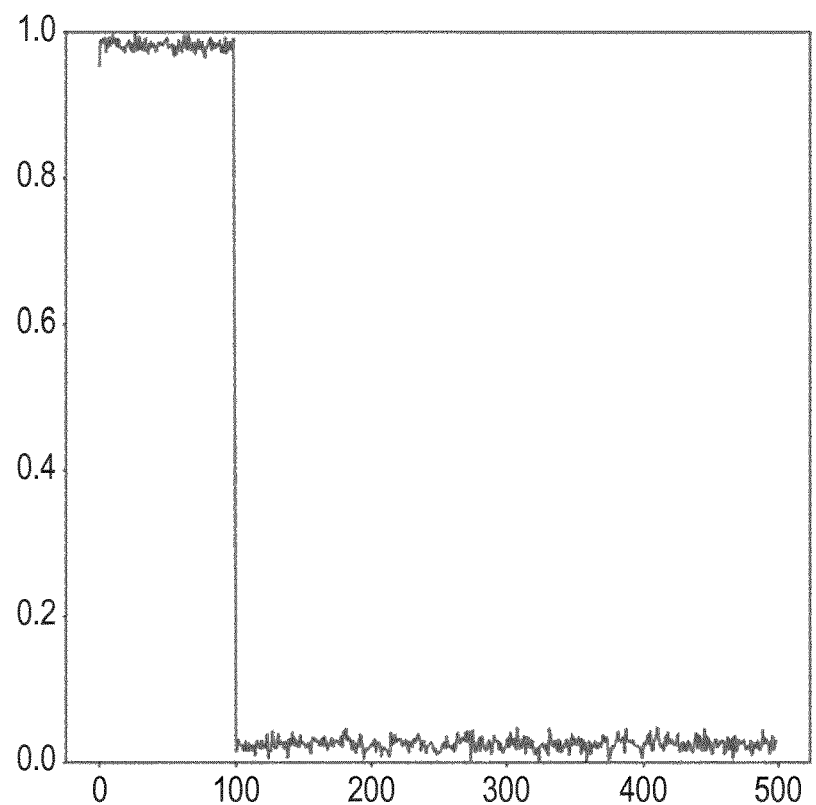
FIGS. 6(a) and 6(b) illustrate the effects of first fault conditions.
Figure 6B:
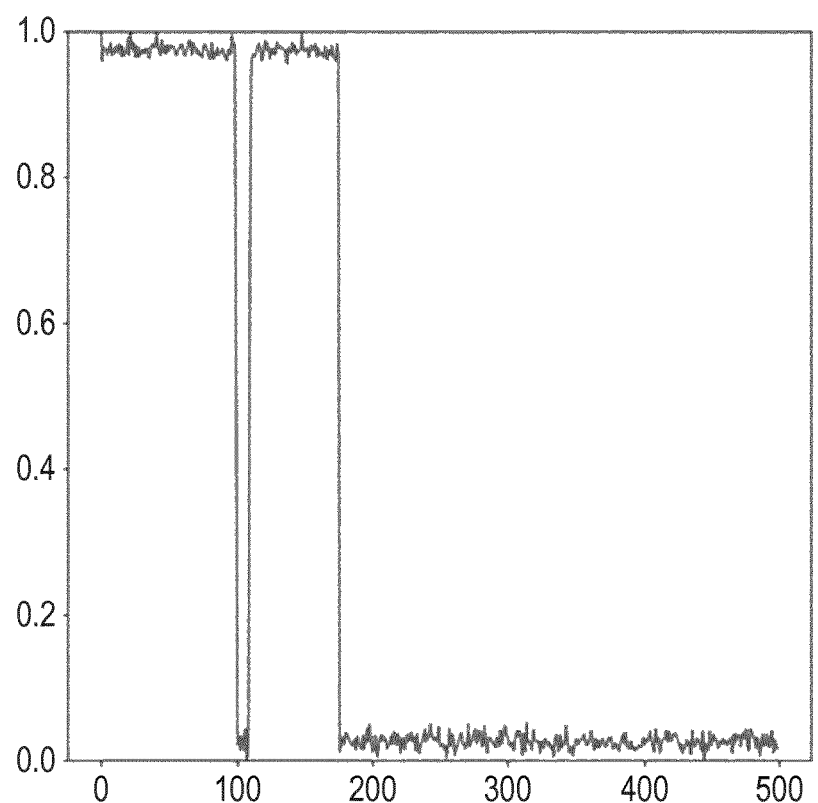

In both FIGS. 6(a) and 6(b), the slope of the curve is very steep. In FIG. 6(a) the power falls steeply, i.e. with a large negative gradient, close to zero at around 100 samples. In the event of a slow drop of the main host power, there can be some bouncing, i.e. some temporary increases followed by falls, as shown in FIG. 6(b), i.e. the power falls steeply close to zero and then returns close to 100% at around 100 samples, before falling steeply again close to zero, due to the host voltage crossing the ON/OFF threshold of the module.

Thus, if the recorded samples match the pattern shown in FIG. 6(a) or 6(b), a determination can be made that there is a power fault in the remote host.

Figure 7A:
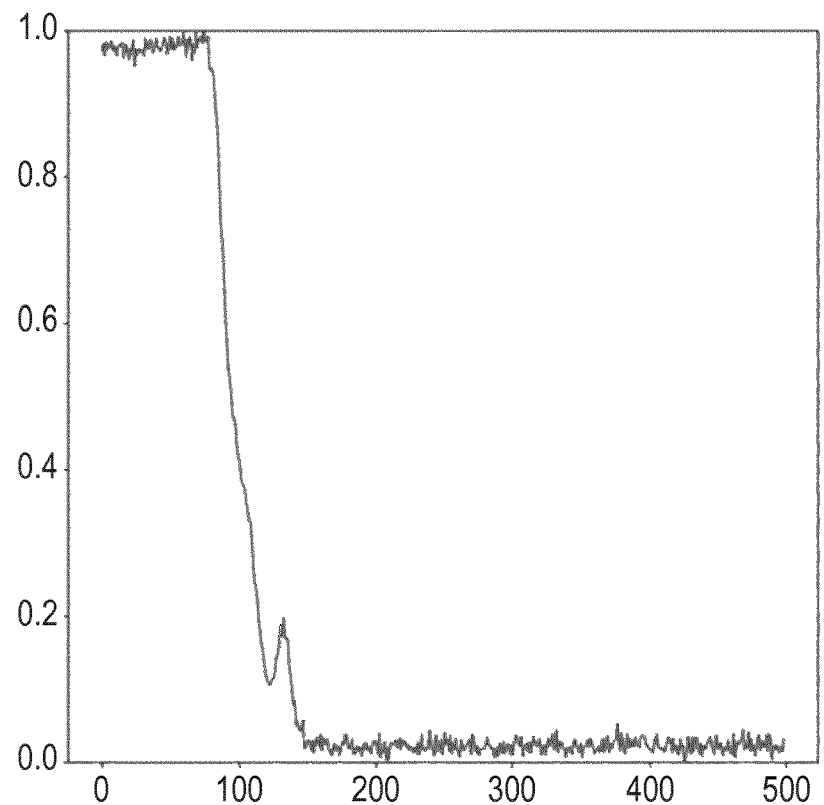
FIGS. 7(a) and 7(b) illustrate the effects of second fault conditions.
Figure 7B:
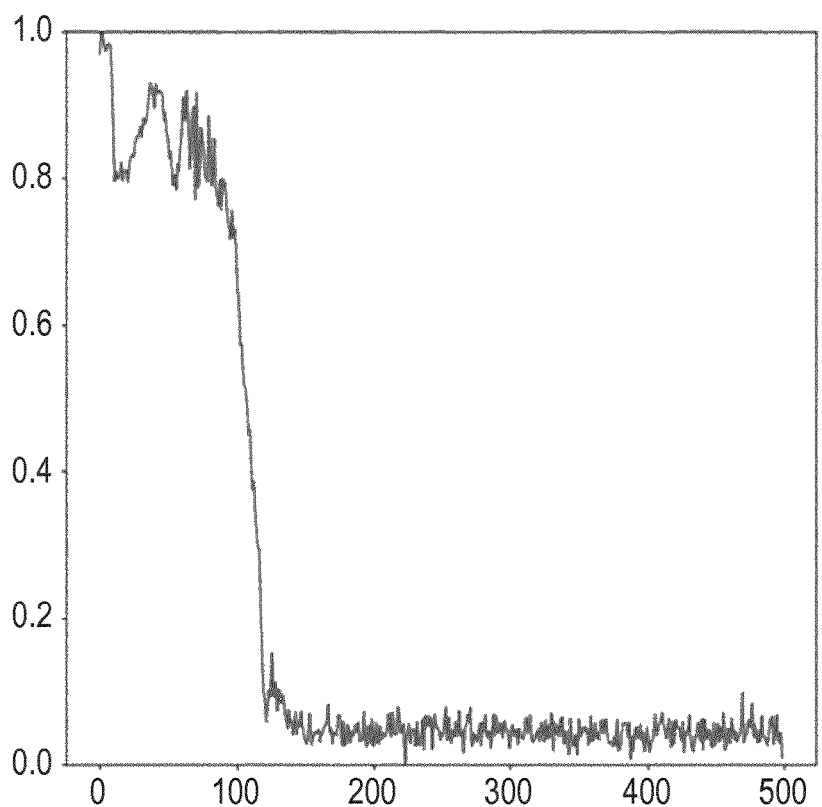

FIGS. 7(a) and 7(b) show examples of the power curve in the event of physical extraction of the optical module from its connector in the host unit. For example, the extraction may be a SFP module extraction.

The falling slope at around 100 samples is less steep, i.e. it has a smaller negative gradient, than the nearly vertical slope experienced in the event of a power drop and shown in FIGS. 6(a) and 6(b). In some cases, there can be bounces in the slope (i.e. some temporary increases followed by falls, for example as shown from about 20-70 samples in FIG. 7(b), due to the power supply of the module bumping to the supply pins of the connector.

Figure 8A:
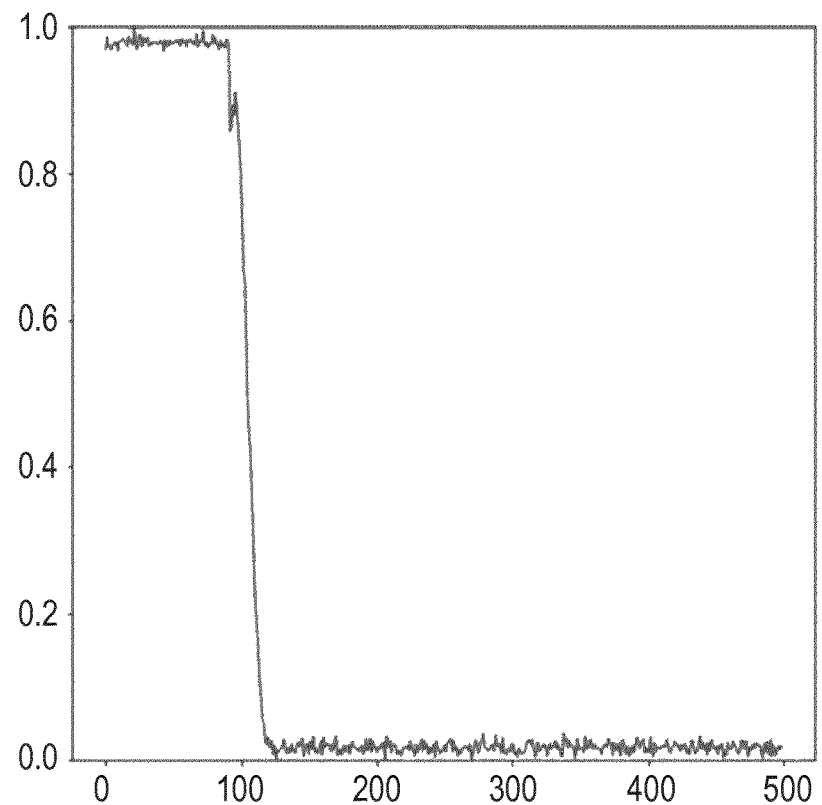
FIGS. 8(a) and 8(b) illustrate the effects of third fault conditions.
Figure 8B:
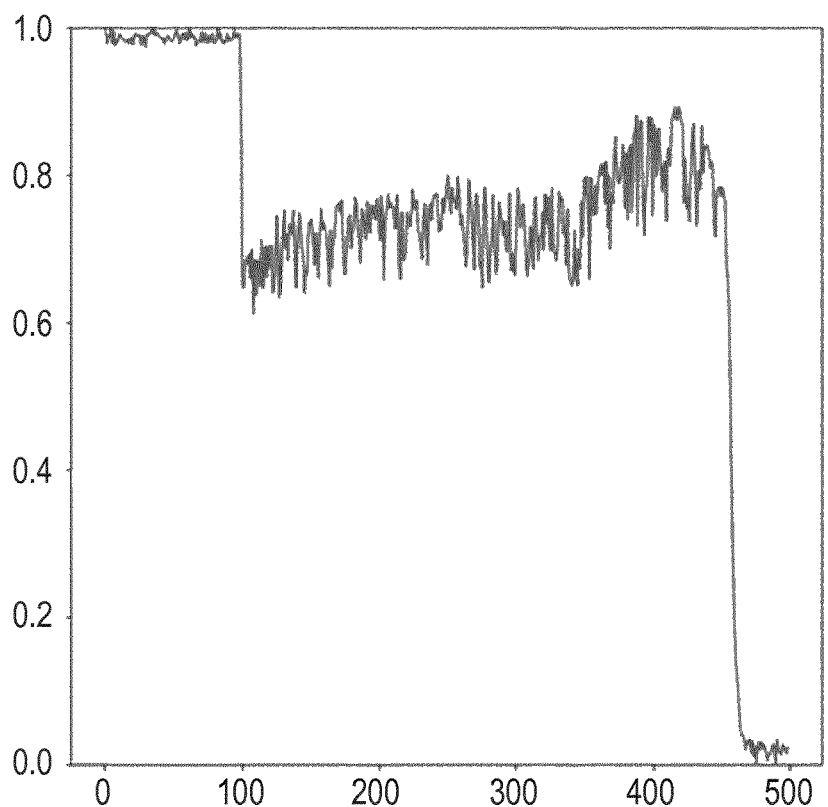

FIGS. 8(a) and 8(b) show examples of the power curve in the event of extraction of the optical connector from the transceiver.

The falling slope of the power curve is very steep, i.e. it has a large negative gradient, but there are bounces, i.e. oscillations of unpredictable length, which can occur over a relatively long period of time (for example as shown between 100-400 samples in FIG. 8(b)) if the manual operation is slow.

FIGS. 9(a), 9(b), 9(c) and 9(d) show examples of the power curve in the event of fiber stress or breakage.

Figure 9A:
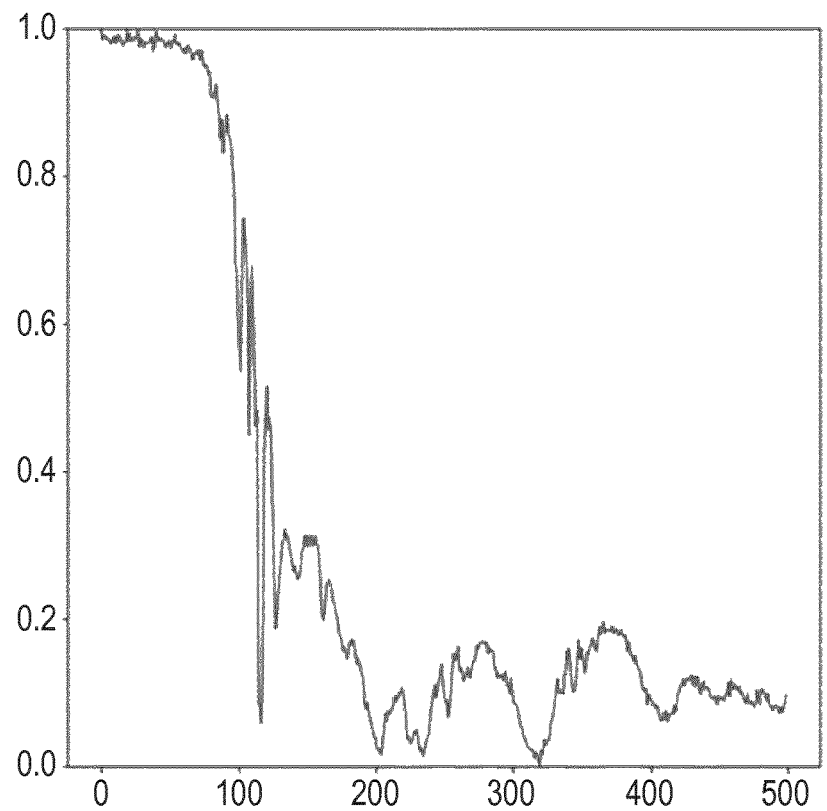
FIGS. 9(a), 9(b), 9(c) and 9(d) illustrate the effects of fourth fault conditions.
Figure 9B:
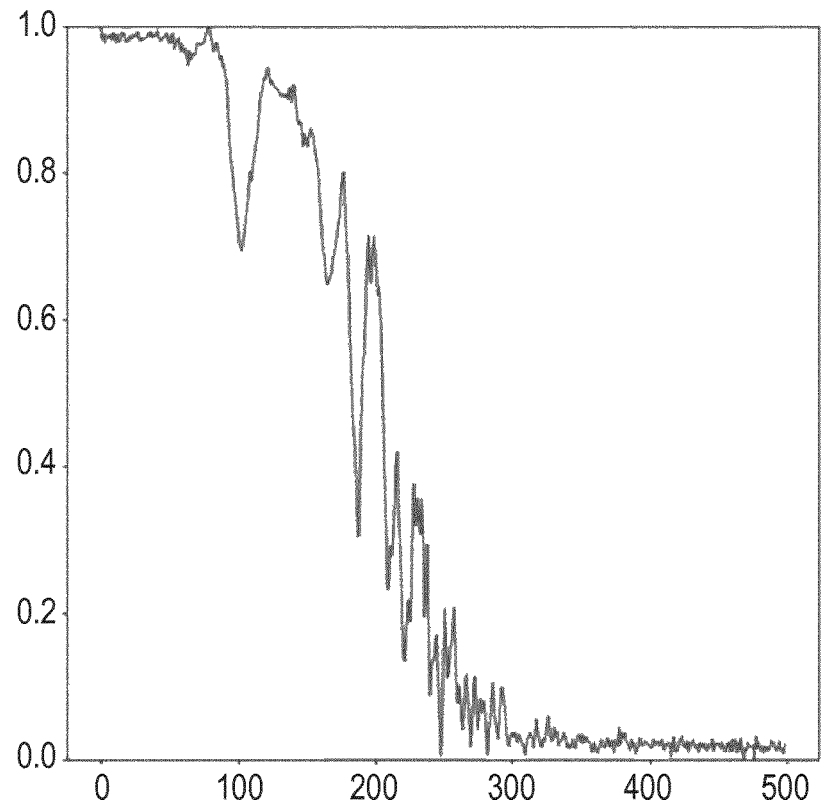
Figure 9C:
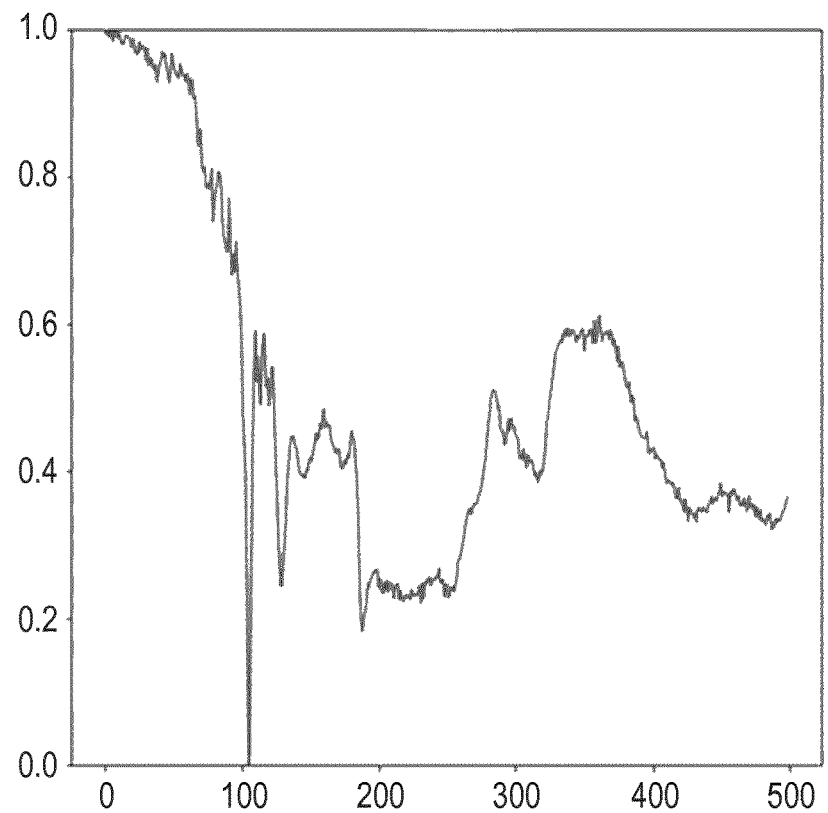
Figure 9D:
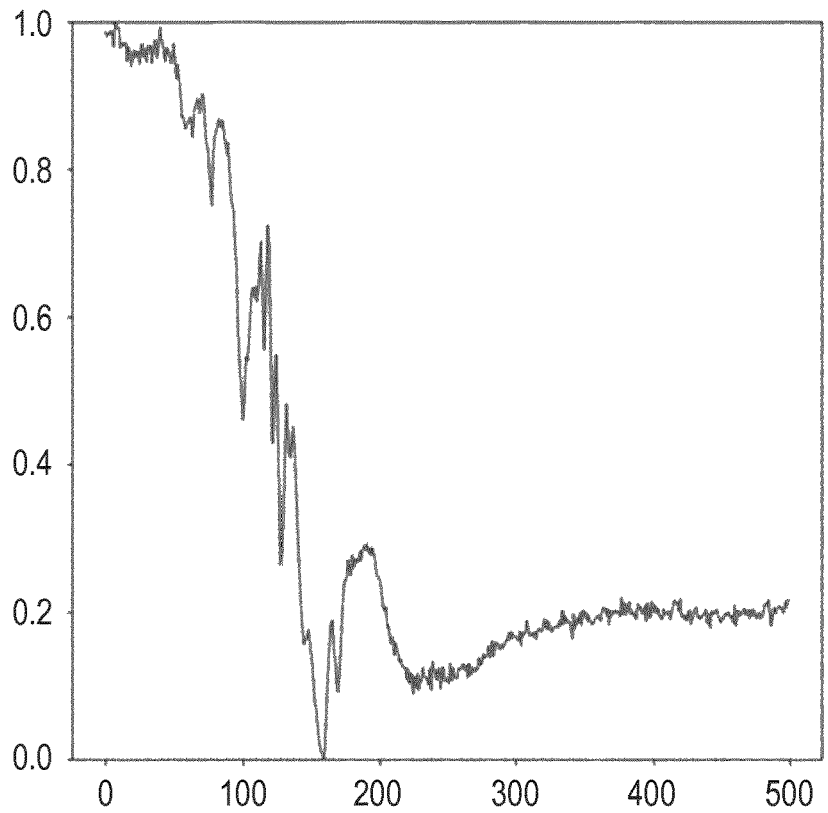

The received power curve is very noisy, depending of the specific kind of stress that is being experienced (for example temporary, continuous, or intermittent). Thus, FIG. 9(a) shows the power falling (though not continuously) to close to zero at about 100 samples, but then oscillating between about 0-30% between about 100-400 samples. FIG. 9(b) shows a series of temporary falls and rises from 100-300 samples, with the power then ending close to zero. FIG. 9(c) shows the power falling to zero at about 100 samples, but then returning in a discontinuous manner to about 40% of the steady state average power. FIG. 9(d) shows the power falling in a discontinuous manner to zero at about 150 samples, but then returning to about 20% of the steady state average power. Thus, the power may end up just being reduced, without being reduced to zero, as shown in FIGS. 9(c) and 9(d) in particular.

Thus, considering the types of fault described with reference to FIGS. 6-9, the type of fault can be identified based on the presence of features such as: a gradient of the power of the optical signal against time; an amount of power, duration and/or number of temporary increases (bounces) in the power of the optical signal, following a drop in the power of the optical signal; an amount of variation of the power, and/or duration, of a plurality of temporary increases (bounces) in the power of the optical signal, following a drop in the power of the optical signal; an amount of noise in the power of the optical signal against time; a final power of the stored series of samples of the optical signal; and a time for the power of the optical signal to drop to zero or a final power.

As mentioned above, different elements of the method can be performed in different locations, depending on the available resources, etc. The classification model that is used to identify the specific event, using the data stored in the log, can be a Machine Learning model, whose complexity and accuracy depend on the actual physical partitioning of the solution and the available computational resources.

FIGS. 10-14 illustrate various possible configurations.

In each of FIGS. 10-14, the raw fiber events collection 400 (as described with reference to step 300 in FIG. 5) and the model training (as described with reference to step 302 in FIG. 5) can be executed just once, with the model training, initializing and storage 402 in the relevant computing entity. Alternatively, further data can be collected, either from the logs generated by network elements in field, or via further lab experiments and research, and the model can be updated with an arbitrary frequency, depending on the availability of new data to improve the model, provided that there is a communication path to access the model storage from the training process. The trained model can then be sent to a location where the classification will take place.

Further, in each of FIGS. 10-14, the incident management function 404 is located in a network management system that is dedicated to alarms collection, communication and management, for example in the network controller 140 of FIG. 1. The incident management function receives its alarm notification inputs from the location where the classification takes place.

FIGS. 10-14 then each show a physical partitioning of the system between three main elements of a system as shown in FIG. 1, namely a) the level of the network management or controller 140, present in the cloud; b) the level of the host unit or network element 104, at the edge of the network; and c) the level of the optical module 106, e.g. SFP module. The transceivers autonomously communicate their status among each other and to the controlling system in order to initiate maintenance operations such as service rerouting or maintenance actions.

Figure 10:
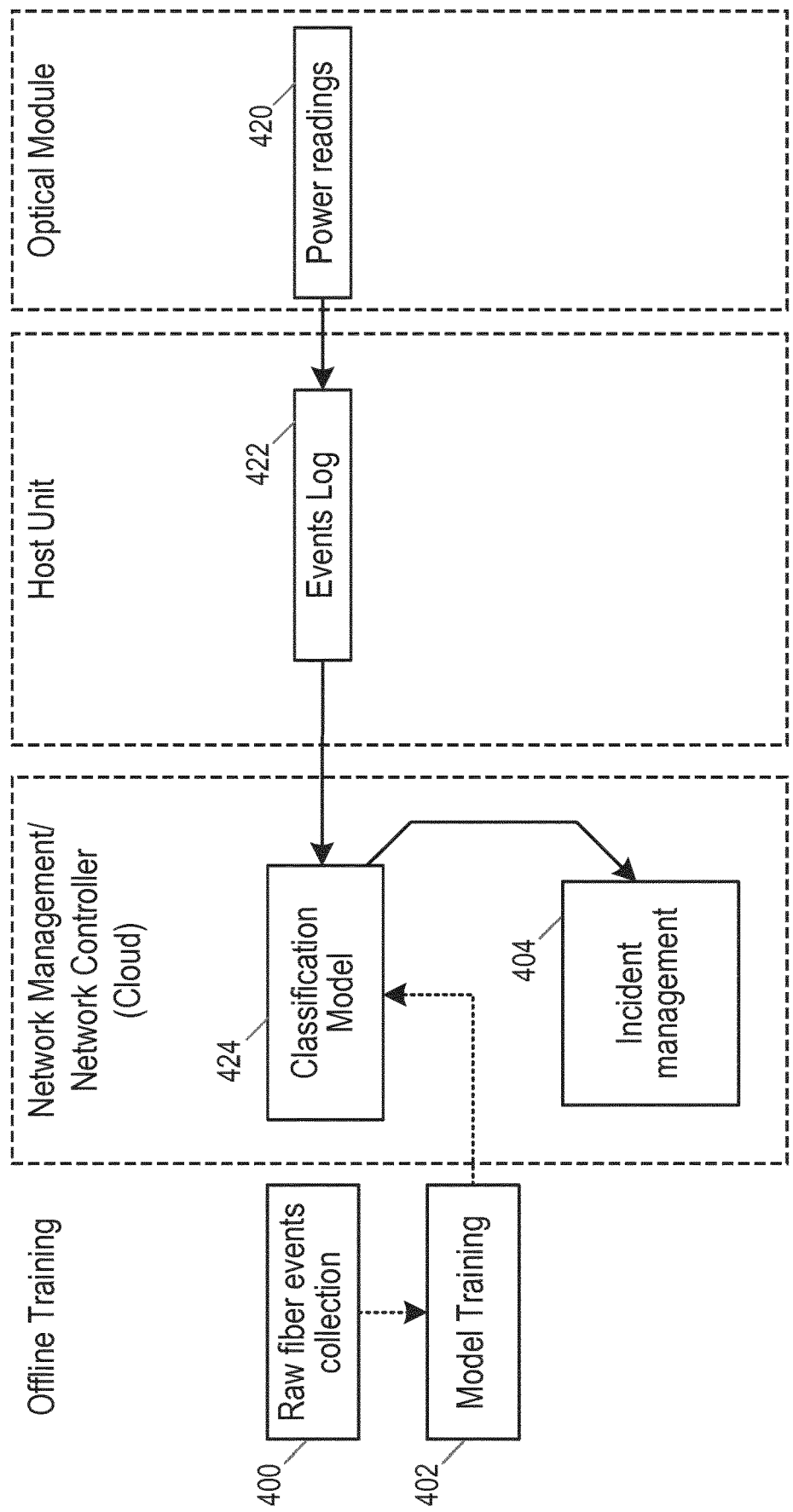
FIG. 10 illustrates components of the system of FIG. 3, in a first configuration.

FIG. 10 shows a configuration where the power readings 420 are generated in the optical module 106, and the events logs 422 are generated in the host unit 104. The classification model 424 is stored in the network controller 140, and so the event logs are sent to the network controller 140 for classification by the classification model 424.

This option has the advantage that it is based on use of common optical modules and network element hardware. The constraint is the capability of the host unit to collect samples from the optical module at a fast and regular enough rate, for example 500 samples/second, but this is well within the capability of an I2C connection between the optical module and a host with a modern Real Time operating system. Training of the machine learning (ML) model is done offline, and the inference is implemented in the cloud system and can be upgraded on demand.

Figure 11:
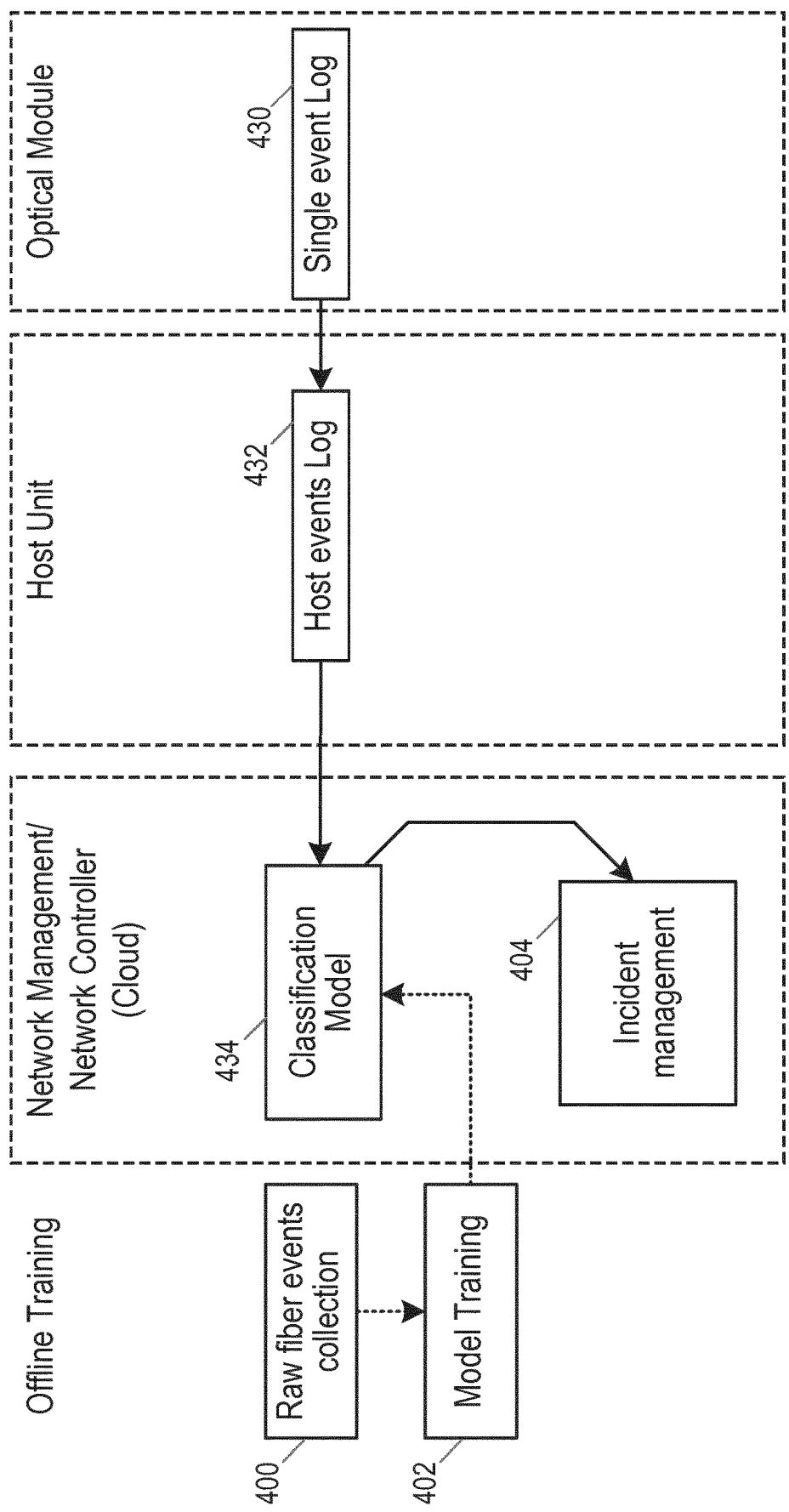
FIG. 11 illustrates components of the system of FIG. 3, in a second configuration.

FIG. 11 shows a configuration where an event log 430 for each fault is generated from the relevant power readings in the optical module 106, while the host unit 104 may store logs 432 generated by multiple optical modules that are connected thereto. The classification model 434 is stored in the network controller 140, and so the event logs are sent to the network controller 140 for classification by the classification model 434.

The implementation of the log generation logic inside the optical module 106 has the advantage of guaranteeing very fast and regular sampling of received power from the ROSA 170. The memory required to store a single event log is well within the amount of RAM available in the controllers used in currently available optical modules, and so this configuration can be implemented using standard hardware.

Figure 12:
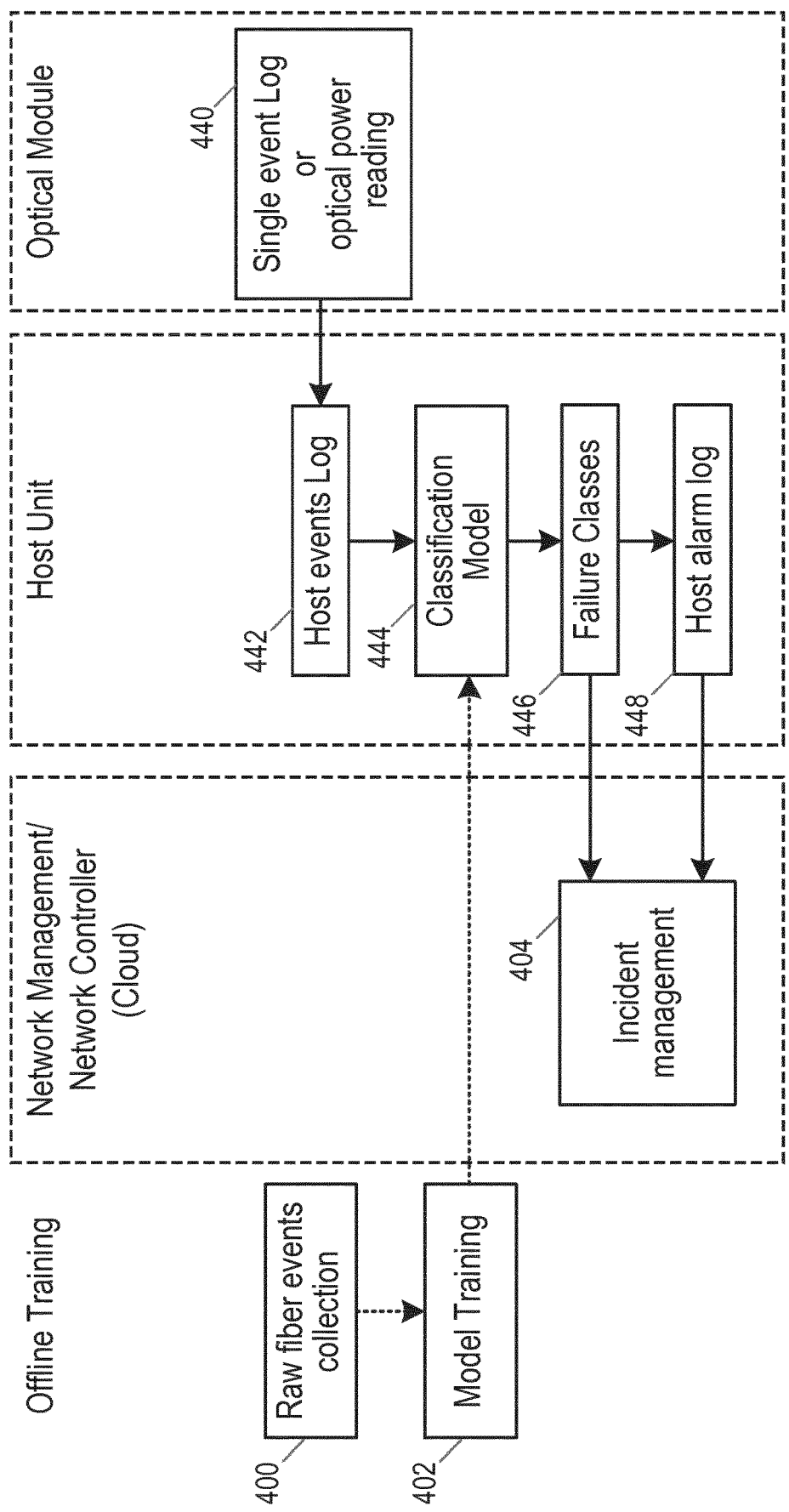
FIG. 12 illustrates components of the system of FIG. 3, in a third configuration.

FIG. 12 shows a configuration where either the power readings 440 are generated in the optical module 106, and the events logs 442 are generated in the host unit 104, or an event log 440 for each fault is generated from the relevant power readings in the optical module 106, and the host unit 104 stores logs 442 generated by multiple optical modules that are connected thereto.

In this configuration, the classification model 444 is stored in the host unit 104, and so the classification process generates information about the failure classes 446 corresponding to each fault, and information about the faults is stored in a host alarm log 448, and information about the failure classes and the host alarms is sent to the incident management block 404 in the network controller 140.

The implementation of the inference on the edge, i.e. in the host unit 104, implies a reasonable computing power and memory on the edge system, for example comparable to a small personal computer.

Figure 13:
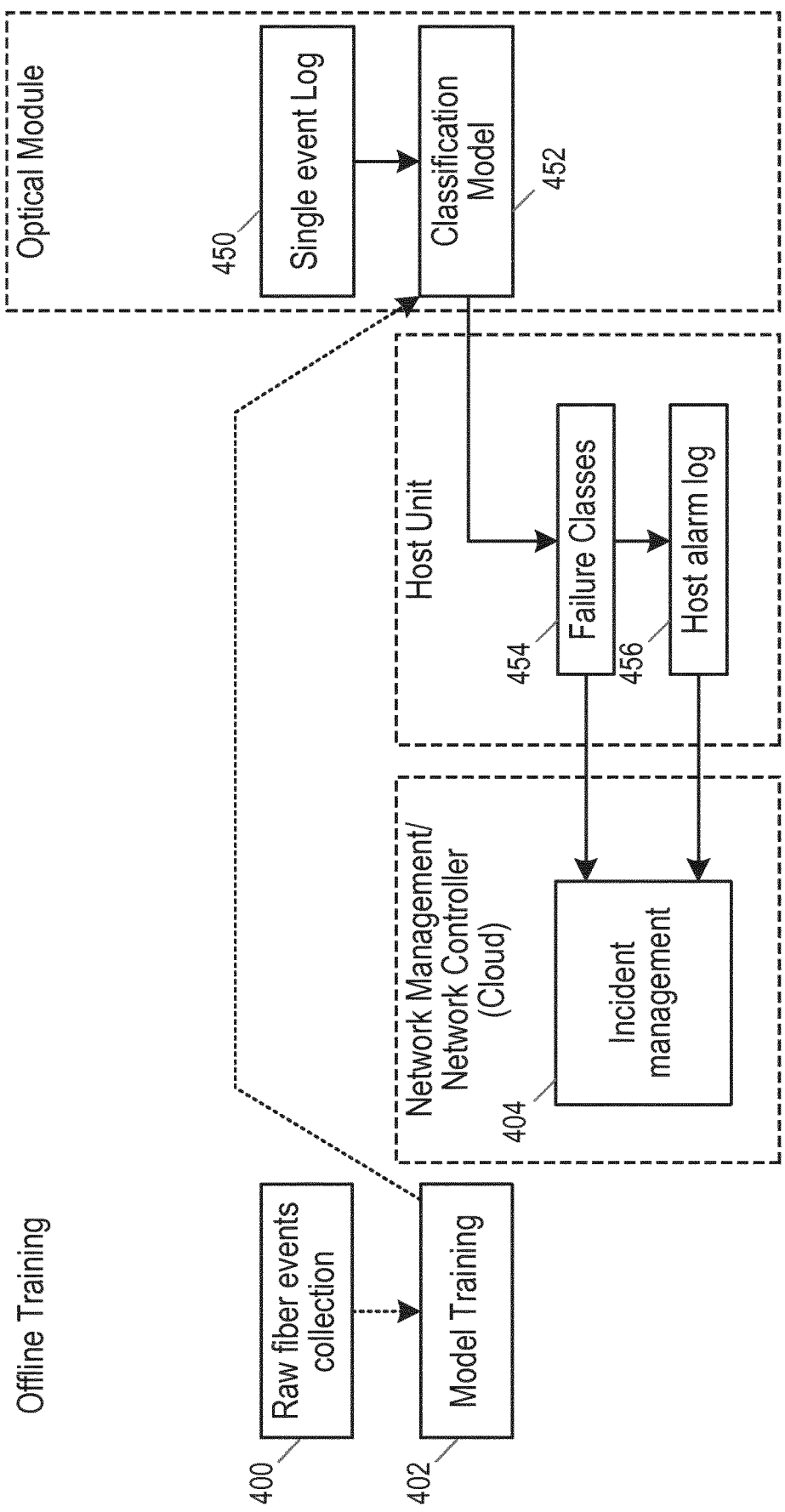
FIG. 13 illustrates components of the system of FIG. 3, in a fourth configuration.

FIG. 13 shows a configuration where an event log 450 for each fault is generated from the relevant power readings in the optical module 106, and further the classification model 452 is also stored in the optical module 106.

The classification process generates information about the failure classes 454 corresponding to each fault, and information about the faults is stored in a host alarm log 456, and information about the failure classes and the host alarms is generated in the host unit 104 and sent to the incident management block 404 in the network controller 140.

This requires the implementation of the inference model on the optical module itself, which may be particularly useful in the case of larger optical interfaces.

Figure 14:
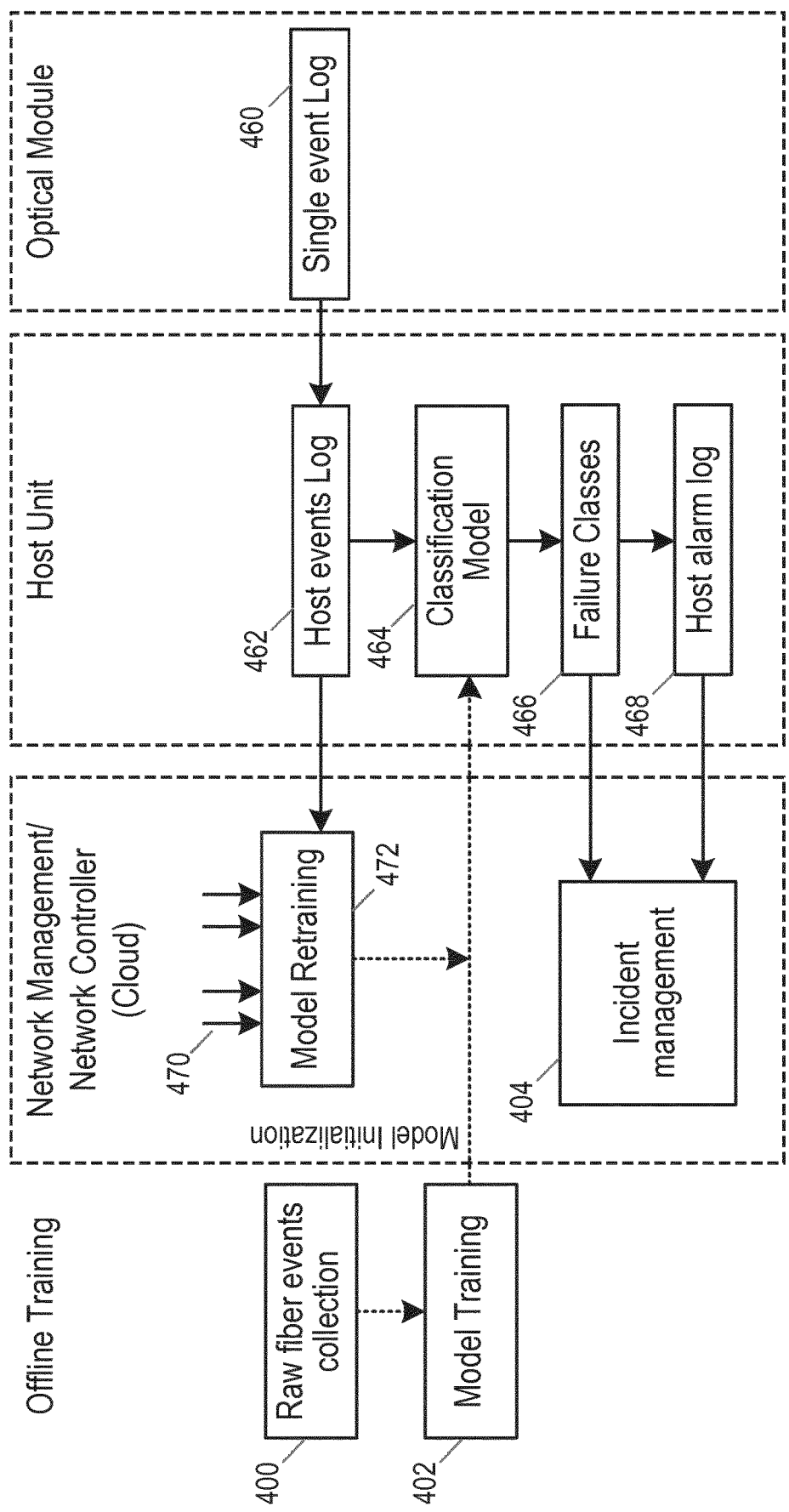
FIG. 14 illustrates components of the system of FIG. 3, in a fifth configuration.

FIG. 14 shows a configuration similar to that shown in FIG. 12, but with retraining of the classification model. Thus, FIG. 14 shows a configuration where an event log 460 for each fault is generated from the relevant power readings in the optical module 106, and the host unit 104 stores logs 462 generated by multiple optical modules that are connected thereto.

The classification model 464 is stored in the host unit 104, and so the classification process generates information about the failure classes 466 corresponding to each fault, and information about the faults is stored in a host alarm log 468, and information about the failure classes and the host alarms is sent to the incident management block 404 in the network controller 140.

Information about each failure event is sent from the host events log 462 in the host unit 104, and corresponding information 470 is sent about failure events detected in other host units, to a model retraining block 472. The model retraining block 472 performs online retraining of the model, with the update of the algorithm executed on the cloud system as new labelled data (for example from the correlation between failure events after they have been analysed by a human expert and the corresponding log stored in a historical database) becomes available.

There are thus provided a method and system for identifying a fault in an optical link, and specifically identifying a most probable cause of the fault, based on a time history of the received power of the optical signal received on the link.

The invention claimed is:

1. A method of identifying a fault in an optical link, the method comprising:
    continually storing samples of a signal, wherein the signal represents a power of an optical signal received over the optical link;
    when a fault is detected on said optical link, retrieving at least one stored series of samples of the signal, wherein retrieving the stored samples comprises retrieving samples stored before the fault was detected; and
    performing a classification on the retrieved series of samples, to classify the series of samples as resulting from one of a plurality of predefined faults.

2. The method of claim 1, wherein the method further comprises storing the samples of the signal for a predetermined time and then overwriting the stored samples with new samples.

3. The method of claim 2, wherein the number of samples stored is between 1,000 and 10,000 and/or the predetermined time is between 0.5 and 5 seconds.

4. The method of claim 1, wherein the method comprises retrieving a plurality of stored series of samples of the signal, and wherein the plurality of stored series of samples are obtained with different sampling rates.

5. The method of claim 1, wherein the method comprises performing said classification using a machine learning model.

6. The method of claim 1, wherein the predefined faults comprise at least one of: a power fault at a remote end of the optical link; extraction of a module containing an optical transceiver; removal of an optical connector; and a fault in an optical fiber of the optical link.

7. The method of claim 1 wherein performing the classification comprises determining a match with one of the plurality of predefined faults for one or more of:
    a gradient of the power of the optical signal against time;
    an amount of power, duration and/or number of temporary increase(s) in the power of the optical signal, following a drop in the power of the optical signal;
    an amount of variation of the power, and/or duration, of a plurality of temporary increases in the power of the optical signal, following a drop in the power of the optical signal;
    an amount of noise in the power of the optical signal against time;
    a final power of the stored series of samples of the optical signal; and
    a time for the power of the optical signal to drop to zero or a final power.

8. The method of claim 1, wherein the method comprises receiving the optical signal in an optical transceiver module provided in a multi-source agreement form factor, for example a small form-factor pluggable (SFP) module, a Quad Small Form-factor Pluggable (QSFP) module, or a C form-factor pluggable (CFP) module.

9. The method of claim 1, wherein the method comprises storing the series of the samples of the signal in a module including an optical transceiver.

10. The method of claim 1, wherein the method comprises storing the series of the samples of the signal in a host unit including an optical transceiver module.

11. The method of claim 1, wherein the method comprises performing said classification in a module including an optical transceiver.

12. The method of claim 1, wherein the method comprises performing said classification in a host unit including an optical transceiver module.

13. The method of claim 1, wherein the method comprises performing said classification in a network node.

14. A system for identifying a fault in an optical link, the system comprising:
- a memory configured for storing at least one stored series of samples of a signal, wherein the signal represents a power of an optical signal received over the optical link, and
- a processor configured to, when a fault is detected on said optical link, retrieve said at least one stored series of samples, and perform a classification on the retrieved series of samples, in order to classify the series of samples as resulting from one of a plurality of predefined faults;

wherein the memory and processor are configured to store the samples of the signal for a predetermined time and then overwrite the stored samples with new samples.

15. An optical module, comprising:
- a receiver assembly, configured to convert a received optical signal into an electrical signal and to generate a signal representing a power of the received optical signal;
- an analog-digital converter configured to generate samples of the signal representing the power; and
- a memory circuit configured to store the samples of the signal for a predetermined time, and then overwrite the stored samples with new samples, such that the stored samples can be retrieved when a fault is detected on an optical link including the optical module.

16. An optical module according to claim 15, further configured to store a classification model and to perform a classification on the retrieved samples, to classify the samples as resulting from one of a plurality of predefined faults, when the fault is detected.

17. A network node, comprising:
- a memory for storing a classification model, wherein the network node is configured to:
- when a fault is detected on an optical link, receive a stored series of samples of a signal representing a power of an optical signal received in an optical module forming part of the optical link; and perform a classification on the received series of samples, to classify the samples as resulting from one of a plurality of predefined faults, wherein performing the classification comprises determining a match with one of the plurality of predefined faults for one or more of:
- a gradient of the power of the optical signal against time;
- an amount of power, duration and/or number of temporary increase(s) in the power of the optical signal, following a drop in the power of the optical signal;
- an amount of variation of the power, and/or duration, of a plurality of temporary increases in the power of the optical signal, following a drop in the power of the optical signal;
- an amount of noise in the power of the optical signal against time;
- a final power of the stored series of samples of the optical signal; and
- a time for the power of the optical signal to drop to zero or a final power.

\* \* \* \* \*